March 31, 1931. G. T. PARR 1,798,490
ICE CREAM DISHER
Filed Oct. 26, 1923 2 Sheets-Sheet 1
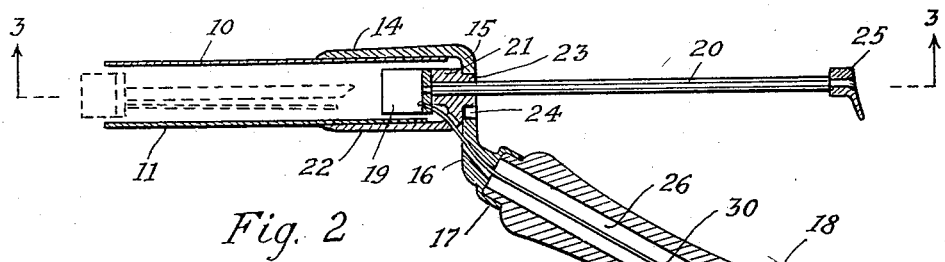
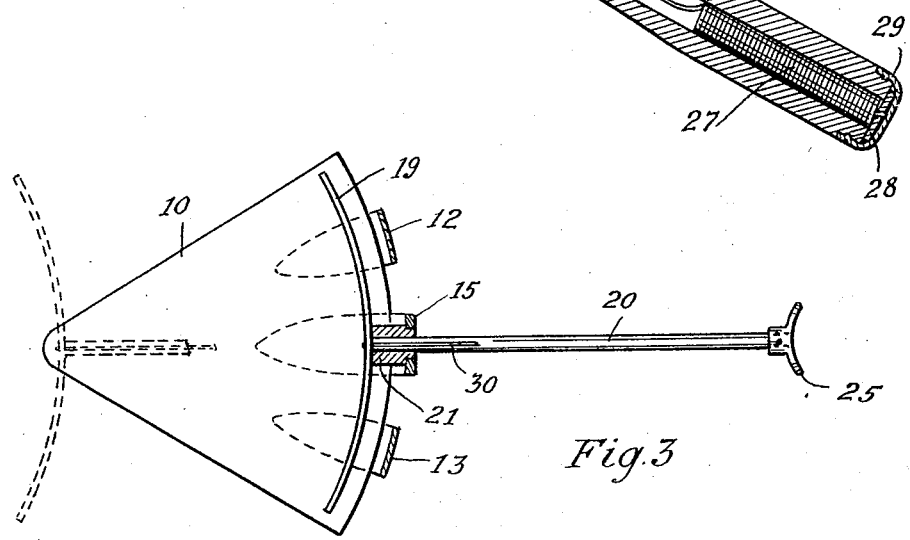
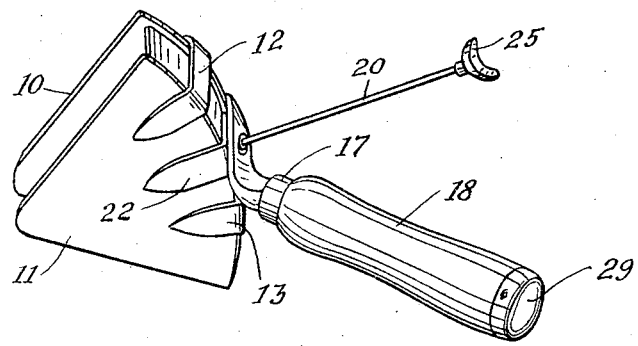
Inventor:
George T. Parr.
By Fischer & Sagaard
his Attorneys.

March 31, 1931. G. T. PARR 1,798,490
ICE CREAM DISHER
Filed Oct. 26, 1923 2 Sheets-Sheet 2
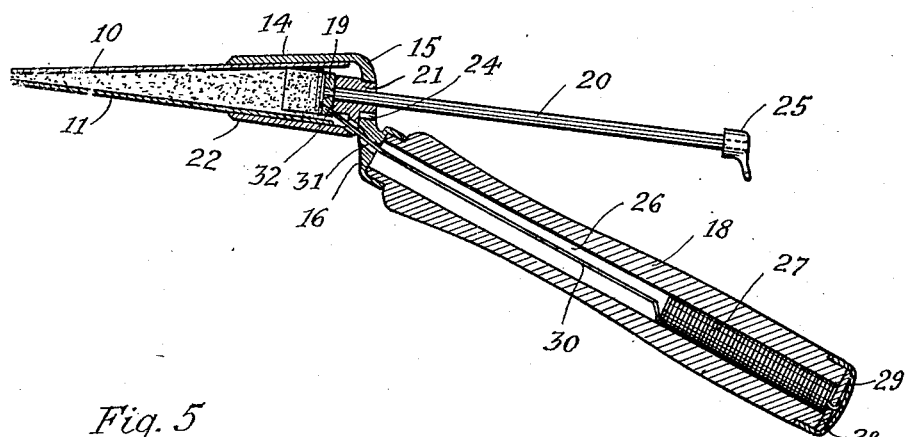
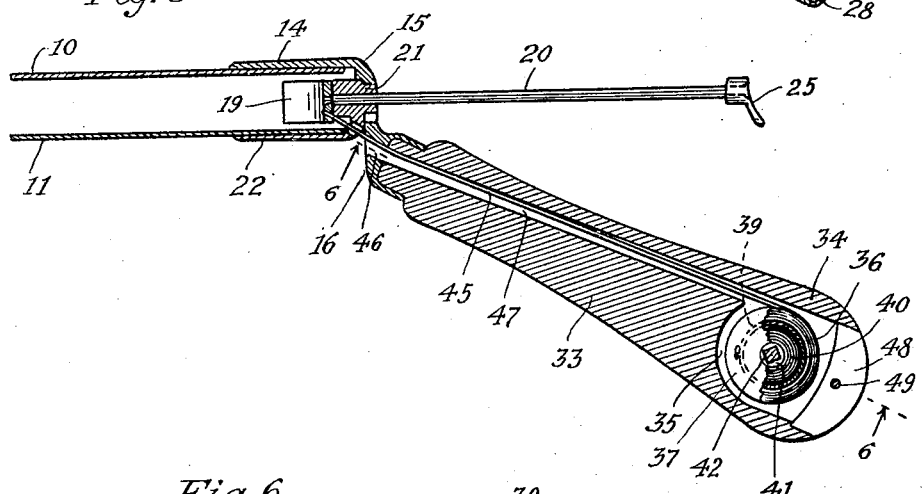
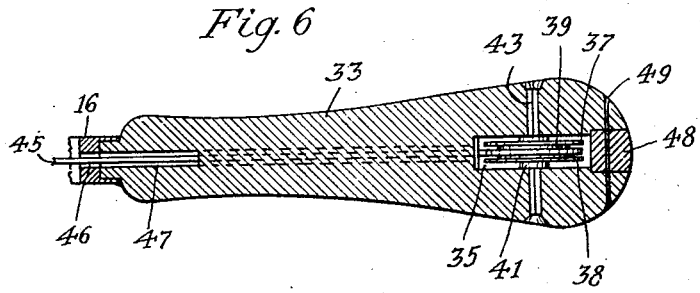
Inventor:
George T. Parr.
By Fischer & Sagaard
his Attorneys.

Patented Mar. 31, 1931

1,798,490

UNITED STATES PATENT OFFICE

GEORGE T. PARR, OF ST. PAUL, MINNESOTA

ICE-CREAM DISHER

Application filed October 26, 1923. Serial No. 670,870.

My invention relates to ice cream dishers and has for its object to provide an ice cream disher by means of which ice cream may be readily removed from the bulk in slices and deposited where required.

Another object of the invention resides in providing a pair of parallel plates adapted to be inserted into the ice cream with means for holding the ice cream between the plates during the removal of the same from the disher.

Another object of the invention resides in providing a plunger for ejecting the ice cream from between the plates, together with resilient means for returning said plunger to its normal position.

A still further object of the invention resides in providing a handle formed on said disher in which the resilient means for returning the plunger to normal position are confined.

Other objects of the invention reside in the detailed construction of the invention as clearly brought out in the following specification and claims.

In the drawings illustrating my invention in one form:

Figure 1 is a perspective view of my improved ice cream disher.

Figure 2 is a longitudinal sectional view of the structure shown in Figure 1.

Figure 3 is a sectional view taken on line 3—3 of Figure 2.

Figure 4 is a view similar to Figure 2 showing the parts in altered relation.

Figure 5 is a view similar to Figure 2 of a modified form of the invention.

Figure 6 is a sectional view taken on line 6—6 of Figure 5.

My invention, as best illustrated in Figures 1 and 2, comprises two parallel plate members 10 and 11 which may be in the shape of a piece of pie or other suitable shape, if desired. These plates are held together in spaced relation by means of two U-shaped spring members 12 and 13 secured thereto as best shown in Figure 1. These spring members may be secured to said plates by soldering, riveting or any other means if desired, or may be made integral therewith. To the middle of plate 10 is secured a supporting bracket 14 which has an offset portion indicated at 15 positioned rearwardly of the two plates 10 and 11 and extending below the same, as indicated at 16. This bracket is formed with a ferrule 17 to which is attached a handle 18 extending outwardly therefrom in inclined relation thereto as clearly shown in Figure 2.

Within the disher and between the plates 10 and 11 is positioned an arcuate ejector 19 which has attached to it a rearwardly extending shank 20. The shank 20 is journalled for sliding movement in a boss 21 which is formed on a bracket 22 similar to the bracket 14 and attached to the plate 11, as clearly shown in Figure 1. This boss has a reduced portion 23 which extends through an opening 24 formed in the offset portion 15 of the bracket 14.

With this invention, it can clearly be seen that the shank 20 which has a thumb piece 25 formed at the end of the same may be readily forced forwardly to cause the ice cream lodged between the plates 10 and 11 to be ejected therefrom.

As will be noted in Figure 2, the ejector 19 is of a width somewhat less than the distance between the plates 10 and 11. By pressing the thumb piece 25 toward the handle 18 when the device has the parts so positioned as illustrated in Figure 2, the boss 21 and consequently the plate 11 attached thereto by means of bracket 22 may be forced toward the plate 10 swinging upon the two spring members 12 and 13. To facilitate such movement, the hole 24 is sufficiently enlarged to give the portion 23 of boss 21 free movement. This permits the structure to be moved to its extreme position as shown in Figure 4 when the plates are brought together toward the tip of the same.

In removing ice cream from the bulk, it frequently happens that the ice cream slides from between the plates 10 and 11 becoming discharged where not desired. By swinging the plates 10 and 11 together, as shown in Figure 4, the ice cream can be securely held between the said plates and prevented from being discharged until desired. It can readily be seen that an extremely efficient device is provided having but a single operating lever which is first used for preventing accidental discharge from the disher and which is later used for discharging the ice cream from the same when the occasion arises.

For holding the plunger in its retracted position, I employ the following construction: The handle 18 is formed with a longitudinal bore 26 extending throughout the length of the same. Within this bore is positioned a tension coil spring 27 which is secured to the outward end of the said handle by means of a pin 28 which is placed beneath the last convolution of said spring and rests upon the end of the said handle 18. A cap 29 secured upon the end of the said handle incloses this pin thereby presenting a smooth and neat appearance to the device on the exterior. To the other end of the spring 27 is attached a flexible wire 30 which may be made in a single piece with the stock of said spring 27 or which may be secured thereto in any suitable manner. This wire passes along the bore 26 in handle 18 and through a hole 31 in the offset portion 15 of bracket 14 and through bracket 22 from which the same enters into the space between the two plates 10 and 11 and is directly secured to the lowermost portion of the plunger 19, as indicated at 32. When the plunger 19 is pressed forward by means of the thumb piece 25, the flexible wire is caused to follow it elongating the spring 27. Upon releasing the thumb piece 25, the spring 27 is immediately contracted returning the plunger to its normal position as shown in Figure 2. With this device, a construction is provided by means of which the plunger may be readily returned to its inoperative position and in which the spring means for producing the desired results is wholly confined within the handle of the device.

In Figures 5 and 6, I have shown an alternative form of device for returning the plunger to its normal position. In this figure, a handle 33 of somewhat different shape is employed in place of the handle 18. This handle has an engaging end 34 which is formed with a cylindrically shaped cavity 35. Within this cavity is positioned a spool or reel 36 consisting of two side walls 37 and 38 connected by means of an annular bar 39 which may be riveted or secured thereto in any other suitable manner. Within the interior of the said bar is positioned a clock spring 40 which has one end secured to the said bar and its other end secured to a hub 41 formed with a squared hole 42. This hub is journalled in the sides of the side walls 37 and 38 and is free to rotate relative thereto. The entire reel 36 is positioned within the cavity 35 and is rotatably held in place by means of a squared pin 43 which passes through the hole 42 and holds the hub 41 from rotation. By this means, it can readily be seen that the reel 36 may be rotated against the action of the clock spring 40 so that the said clock spring may be wound up or released as desired. Instead of the wire 30 employed in the other form of the invention, I preferably use a flat ribbon 45 which passes through an opening 46 in the bracket 15 and through a bore 47 in said handle, which communicates with the cavity 35 located at the end thereof. The ribbon 45 is secured to the plunger 19 in any suitable manner and is also secured to the bar 39 of the reel 36. The said ribbon, in addition, makes a number of convolutions upon the reel 36 so that, as the plunger 19 is forced outwardly to its extreme position, as shown in dotted lines in Figure 2, the clock spring 40 becomes wound up and the same is caused to return the plunger to its retracted position when the thumb piece is released. If desired, a wire such as shown in Figures 1 and 3 may be used, though I find it preferable to employ a ribbon due to its great flexibility, which permits the same to readily follow the movements of the plunger which are in inclined relation to the spring. For enclosing the reel 36 and spring mechanism connected therewith, I provide a plug 48 which is inserted into the end of the cavity 35 and which may be held in place therein by means of a pin 49 passing through the walls of the handle 33 and the said plug.

In using the device, the parts are normally positioned as shown in Figure 2. By placing the handle 18 in the hand with the cap portion 29 thereof resting in the palm of the hand, the disher may be shoved down into the ice cream, separating along the sides of the same a slice of ice cream which becomes lodged within the plates 10 and 11. By now moving the disher laterally within the ice cream, the section of ice cream lodged between the plates 10 and 11 becomes broken off along the edges and is completely severed from the bulk of the ice cream within the container. In the ordinary use of the disher, upon lifting the same out of the bulk ice cream, the slice of ice cream positioned between the plates 10 and 11 would frequently drop out before the required time. This may be entirely eliminated by pressing the thumb piece 25 secured to the handle 18. This causes the plates 10 and 11 to be brought toward one another as clearly shown in Figure 4. With the parts so arranged, the slice of ice cream between the same may be firmly held in place when the dispenser is removed from the bulk ice cream without the slightest danger of the ice cream being discharged before the required time. Although the plates have been shown as swung toward one another, the maximum amount in Figure 4, it can readily be understood that only a slight pressure need be applied to the thumb piece 25 to cause the ice cream to remain securely in place. When the ice cream is soft, the degree of pressure can be increased a slight amount to render the accidental discharge of the ice cream from the dispenser practically impossible. When the disher has been removed with the contents therein and the same placed in proximity to the object upon or within which the ice cream is to be discharged, the pressure upon the thumb piece 25 can be removed. After this the plunger 19 may be forced outwardly into the position shown in dotted lines in Figure 2, thereby causing the ice cream to be discharged from the dispenser upon or within the particular object required. This is accomplished by placing the handle 18 within the hand, positioning the forefinger in back of the portion 16 of the bracket 14 and upon exerting pressure upon the thumb piece 25 in the direction of the shank 20 so that the said plunger 19 is forced along the inner surfaces 10 and 11. It can readily be seen that, by pressing the thumb piece 25 inwardly or outwardly that a slice of ice cream of varying thicknesses may be removed from the bulk if desired.

The advantages of my invention are manifest. A device is provided by means of which the ice cream may be held within the disher subsequently dispensed therefrom by the manipulation of but a single operating member. The action required in holding the ice cream in place is that which would logically occur to the user in that the blades of the disher are caused to be pinched together by the forcing of the two handles together. Upon releasing the plunger and pressing the same outwardly without shifting the fingers, the ice cream may be effectively discharged from the disher. By means of the resilient device, the plunger is quickly and effectively returned into its retracted position so that the disher is immediately ready for use again as soon as the thumb piece for operating the said plunger is released. The springs are wholly concealed within the handle and the same are sufficiently enclosed so that dirt and other foreign matter can not readily enter the same and render the device inoperative.

In accordance with the patent statutes, I have described the princples of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim:

1. An ice cream disher comprising a pair of spaced plates, an ejector positioned between said plates and adapted to discharge the contents of said disher, spring means under tension when the ejector is operated to discharge ice cream, and means for causing one of said plates to pivot towards the other plate and to hold the ice cream within the disher.

2. An ice cream disher comprising a pair of spaced plates, spring members for connecting said plates together, said spring member holding plates spaced apart, an ejector slidably mounted relative to one of said plates and means connected to said ejector for moving the same, said means being slidably supported by one of said plates and being capable of being operated to move one of said plates toward the other.

3. An ice cream disher comprising a pair of spaced plates, spring members connecting said plates together, said spring members holding said plates from movement toward one another, an ejector slidably mounted between said plates and means connected to said ejector for swinging said plates toward one another to hold the ice cream between the same.

4. An ice cream disher comprising a pair of spaced plates, U-shaped spring members connected to said plates permitting the same to be moved relative to one another, an offset bracket secured to one of said plates, a handle secured to said bracket, a boss secured to the other of said plates, a shank slidably mounted in said bracket and adapted to move said plate to which said boss is attached toward said other plate and an ejector secured to the end of said shank.

5. An ice cream disher comprising a receiving compartment open at the back, front and side edges thereof, an ejector within said compartment, a handle, a spring member encased in said handle and means for connecting said spring member with said ejector whereby said spring member becomes operated when the ejector is operated.

6. An ice cream disher comprising a pair of spaced plates, an ejector slidable between said plates, a handle issuing outwardly from said plates in inclined relation thereto, a spring positioned within said handle, a flexible member connecting said spring with said ejector adapted to operate said spring when the ejector is caused to discharge the ice cream from the disher.

7. An ice cream disher comprising a pair of spaced plates, an ejector positioned within said plates, a handle issuing diagonally outwardly from said plates, said handle having a longitudinal bore within the same, a coil spring positioned at the outer end of said handle, a flexible member connected with said spring at one end and with said ejector at the other end and adapted to place said spring under tension when the ejector is operated to discharge the ice cream from within the disher.

8. An ice cream disher comprising a pair of spaced plates, an ejector positioned within said plates, a handle issuing diagonally outwardly from said plates, said handle having a longitudinal bore within the same, a coil spring positioned at the outer end of said handle, a flexible member connected with said spring at one end and with said ejector at the other end and adapted to place said spring under tension when the ejector is operated to discharge the ice cream from within the disher and a cap secured upon the end of said handle for enclosing said bore and said spring positioned therein.

GEORGE T. PARR.